United States Patent
Karnik et al.

(10) Patent No.: US 11,210,259 B1
(45) Date of Patent: Dec. 28, 2021

(54) MODULE FOR ASYNCHRONOUS DIFFERENTIAL SERIAL COMMUNICATION

(71) Applicant: Endress+Hauser SE+Co. KG, Maulburg (DE)

(72) Inventors: Gautham Karnik, Whitestown, IN (US); Chris Abbott, Indianapolis, IN (US)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 17/107,254

(22) Filed: Nov. 30, 2020

(51) Int. Cl.
*G06F 13/42* (2006.01)

(52) U.S. Cl.
CPC ...... *G06F 13/4282* (2013.01); *G06F 13/4226* (2013.01)

(58) Field of Classification Search
CPC .......... G06F 13/4282; G06F 13/4226
See application file for complete search history.

(56) References Cited

U.S. PATENT DOCUMENTS

| | | | | |
|---|---|---|---|---|
| 6,553,076 B1* | 4/2003 | Huang | ................... | H04B 3/548 |
| | | | | 375/219 |
| 10,635,611 B1* | 4/2020 | Srivastava | .......... | G06F 13/4081 |
| 2019/0317132 A1* | 10/2019 | Ju | .......................... | G01R 31/58 |

* cited by examiner

*Primary Examiner* — Zachary K Huson
(74) *Attorney, Agent, or Firm* — Mark A. Logan; Endress+Hauser (USA) Holding Inc.

(57) ABSTRACT

A module for asynchronous differential serial communication on a bus is disclosed. The module is connectable to the bus in a first connecting mode, wherein a non-inverting terminal of the module is connected to a non-inverted bus signal line and an inverting terminal is connected to an inverted bus signal line, and a second connecting mode given by an inverse of the first connecting mode. The module includes a detector determining the connecting mode based on the binary state of a start bit of a reception signal provided by a transceiver of the module based on a received communication signal and a binary state of a first bit of a reference signal corresponding to a voltage difference between the voltages of the signals received via the non-inverted and the inverted terminal during reception of this communication signal.

15 Claims, 4 Drawing Sheets

MODULE FOR ASYNCHRONOUS DIFFERENTIAL SERIAL COMMUNICATION

TECHNICAL FIELD

The present disclosure relates to a module for asynchronous differential serial communication on a bus, the module comprising: a processor, a transceiver connected to the processor and a set of terminals connected to the transceiver; the set of terminals including: a reference terminal connected to or connectable to a reference potential and two signal terminals including a non-inverted terminal and an inverted terminal; wherein the transceiver is embodied to transmit communication signals corresponding to transmit signals provided by the processor, each including a start bit having a predefined binary state specified for communication on the bus, by: via its non-inverted port connected to one of the signal terminals providing non-inverted signals corresponding to the transmit signals and via its inverted port connected to the other one of the signal terminals providing inverted signals corresponding to an inverse of the transmit signals; wherein the transceiver is configured to receive communication signals and to determine corresponding reception signals based on a voltage difference of a voltage of a signal received via its non-inverted port and a voltage of a signal received via its inverted port during reception of the respective communication signal such, that each reception signal includes a start bit having the predefined binary state; and wherein the module is connectable to the bus in two different connecting modes including a first connecting mode, wherein the non-inverted terminal is connected to a non-inverted bus signal line of the bus and the inverted terminal is connected to an inverted bus signal line of the bus, and a second connecting mode, wherein the non-inverted terminal is connected to the inverted bus signal line and the inverted terminal is connected to the non-inverted bus line.

BACKGROUND

In process automation technology field devices are applied to monitor, regulate and/or control operation of industrial sites, as well as to monitor, regulate and/or control at least one process, like e.g. a production process, performed at, on or by the industrial site. Field devices applied for this purpose include measurement devices measuring at least one variable, like e.g. a pressure, a temperature or a flow, as well as field devices including an actuator, like e.g. a valve, applied to influence the operation and/or the process.

In many applications communication busses are applied to enable field devices to communicate with at least one other field device and/or a superordinate unit connected to the same bus. Superordinate units, like e.g. control units, automation systems and programmable logical controllers, are frequently applied in process automation to monitor, regulate and/or to control operation of the site and/or at least one process performed at, on or by the site. As an example, a valve may be opened or closed according to a level of a product in a container based on communication signals, like e.g. measurement signals and/or control signals, transmitted over the bus.

In industrial applications asynchronous differential serial communication is frequently applied due to the low susceptibility of this form of communication to noise and electromagnetic interference. When bidirectional, asynchronous differential serial communication is applied, communication over the bus is performed by transmitting transmit signals including a start bit in form of communication signals including two complementary signals. Each of the two complementary signals is transmitted along a separate signal line of the bus. One of the complementary signals is a non-inverted signal corresponding to the transmit signal and the other one is an inverted signal corresponding to an inverse of the transmit signal. Reception of a communication signal is performed by determining a corresponding reception signal based on a voltage difference of the voltages of the two complementary signals received from the bus.

To allow interoperability of devices of different manufactures, field devices and superordinate units applied on the same bus preferably each comprise a communication module designed according to the same standard. In this respect, the standard RS-485, also known as TIA-485(-A) or EIA-485 jointly published by the Telecommunications Industry Association and Electronic Industries Alliance (TIA/EIA) is well established in industry.

Communication modules designed according to this standard include two signal terminals for connecting the module to the two signal lines of the bus. As an option, especially advantageous when communication signals are transmitted over long distances, a reference terminal of the communication module is e.g. connected to a reference line of the bus providing a reference potential. This option provides better communication stability and reduces the susceptibility to electromagnetic interference.

The RS-485 standard defines the electrical characteristics of drivers and receivers that can be applied in these communication modules and describes the voltage relationship between the two complementary signals for both binary states.

The RS-485 standard neither defines the logic function of the driver and the receiver nor a specific type of connector for connecting the communication modules to the bus. As a result, some manufacturers label the two signal terminals as inverted and non-inverted based on their correspondence to the logical state of the signal to be transmitted, whereas others label the two signal terminals signal according to the logic function of the driver and the receiver.

This makes it rather difficult for a technician connecting a communication module designed according to the standard RS485 to a bus to determine which one of the two signal terminals of the module needs to be connected to which one of the two signal lines of the bus. Due to the different labeling nomenclatures applied by different manufacturers, in many cases, the correct wiring pattern can only be determined based on the instruction manual provided by the manufacturer. This is tedious and time consuming, especially when larger numbers of field devices each comprising a communication module designed according to the RS485 standard have to be connected to the bus. On the other hand, communication modules will not operate correctly, unless they are wired up correctly. When faulty communication caused by an incorrect wiring pattern remains unnoticed, this may have severe consequences on the site, where the module is used. Faulty communication can be due to various reasons. Thus, when faulty communication is noticed, a search for a potential root cause can be tedious, especially when the technician performing the search assumes that the module is wired up correctly.

Accordingly, there remains a need for further contributions in this area of technology.

As an example, there is a need for a module for asynchronous differential serial communication, that can be more easily and more efficiently connected to the bus.

SUMMARY

The present disclosure discloses a module for asynchronous differential serial communication on a bus, the module comprising:

a processor, a transceiver connected to the processor and a set of terminals connected to the transceiver; the set of terminals including: a reference terminal connected to or connectable to a reference potential and two signal terminals including a non-inverted terminal and an inverted terminal;

wherein the transceiver is embodied to transmit communication signals corresponding to transmit signals provided by the processor, each including a start bit having a predefined binary state specified for communication on the bus, by: via its non-inverted port connected to one of the signal terminals providing non-inverted signals corresponding to the transmit signals and via its inverted port connected to the other one of the signal terminals providing inverted signals corresponding to an inverse of the transmit signals;

wherein the transceiver is configured to receive communication signals and to determine corresponding reception signals based on a voltage difference of a voltage of a signal received via its non-inverted port and a voltage of a signal received via its inverted port during reception of the respective communication signal such, that each reception signal includes a start bit having the predefined binary state;

wherein the module is connectable to the bus in two different connecting modes including a first connecting mode, wherein the non-inverted terminal is connected to a non-inverted bus signal line of the bus and the inverted terminal is connected to an inverted bus signal line of the bus, and a second connecting mode, wherein the non-inverted terminal is connected to the inverted bus signal line and the inverted terminal is connected to the non-inverted bus signal line;

the module further including a detector embodied to determine the connecting mode based on the binary state of the start bit of the reception signal provided by the transceiver based on a communication signal received whilst the module is connected to the bus and a binary state of a first bit of a reference signal corresponding to a voltage difference between a voltage of the signal received via the non-inverted terminal and a voltage of the signal received via the inverted terminal during reception of the same communication signal and to provide an output indicating the detected connecting mode.

The module provides the advantage that the detector determines and provides the connecting mode. Thus, the connecting mode is available based on the first communication signal received by the module. This provides the advantage that undesired connecting modes do not remain unnoticed and that suitable counter measures can be applied. This way, proper operation of the module is ensured more easily and more efficiently.

In an embodiment, the detector is configured to provide an output indicating that the module is connected to the bus in the first connecting mode when the binary state of the first bit of the reference signal and the binary state of the start bit of the reception signal are identical and configured to provide an output indicating that the module is connected to the bus in the second connecting mode when the binary state of the first bit of the reference signal and the binary state of the start bit of the reception signal are different.

In another embodiment, the detector includes: a signal generator having a first input connected the non-inverted terminal, a second input connected to the inverted terminal, and an output providing the voltage difference between the voltage of the signal received via the non-inverted terminal and the voltage of the signal received via the inverted terminal; and a signal processor: connected to the output of the signal generator, connected to an output of the transceiver providing the reception signal, and configured to determine the binary state of the first bit based on the voltage difference provided to the signal processor by the signal generator, to compare the binary state of the first bit to the binary state of the start bit of the corresponding reception signal, and to provide the output indicating the connecting mode determined by the signal processor based on the two binary states.

In another embodiment, the signal generator is or includes a differential amplifier providing a voltage corresponding to the voltage difference, the differential amplifier having a non-inverting input connect to the non-inverted terminal, an inverting input connected to the inverted terminal and an output connected to the signal processor.

In another embodiment, the module comprises at least one of: an indicator connected to the output of the detector; the indicator including at least one of: a single LED or a single red LED, that lights up when the second connecting mode is detected or two LED including a first LED or a green LED, that lights up when the first connecting mode is detected and a second LED or a red LED, that lights up when the second connecting mode is detected; a display displaying the connecting mode detected by the detector; and a signal output connected to the output of the detector and providing a connecting mode signal indicating the connecting mode detected by the detector.

In another embodiment, the module additionally comprises a signal inverter, wherein the signal converter is: inserted in a set of connecting lines including a connecting line connecting the non-inverted port to the non-inverted terminal and a connecting line connecting the inverted port to the inverted terminal; configured such that signals travelling along the connecting lines through the signal inverter in either direction of communication whilst the signal inverter is disabled pass through the signal inverter unaltered; and configured such that signals travelling along the connecting lines through the signal inverter in either direction of communication whilst the signal inverter is enabled, are each inverted by the signal inverter.

In a first embodiment, the module comprises a signal inverter, wherein the signal inverter is inserted in a set of connecting lines including a connecting line connecting the non-inverted port to the non-inverted terminal and a connecting line connecting the inverted port to the inverted terminal. The signal inverter is configured such that signals travelling along the connecting lines through the signal inverter in either direction of communication whilst the signal inverter is disabled pass through the signal inverter unaltered. The signal inverter is further configured such that during transmission of each communication signal transmitted whilst the signal inverter is enabled, the enabled signal inverter provides a signal corresponding to the inverse of the signal received from the non-inverted port of the transceiver to the non-inverted terminal and provides a signal corresponding to the inverse of the signal received from the inverted port of the transceiver to the inverted terminal, and the signal inverter is further configured such that during reception of each communication signal received whilst the signal inverter is enabled, the enabled signal inverter provides a signal corresponding to the inverse of the signal received from the non-inverted terminal to the non-inverted port of the transceiver and provides a signal corresponding to the inverse of the signal received from the inverted terminal to the inverted port.

In another embodiment, a signal inverter is inserted in a set of connecting lines including a connecting line connecting the non-inverted port to the non-inverted terminal and a connecting line connecting the inverted port to the inverted terminal; and the signal inverter is or includes a switch system configured to be operating in a first switch setting whilst the signal inverter is disabled, wherein the switch system connects the non-inverted terminal to the non-inverted port and connects the inverted terminal to the inverted port; and be operating in a second switch setting whilst the signal inverter is enabled, wherein the switch system connects the non-inverted terminal to the inverted port and connects the inverted terminal to the non-inverted port.

In another embodiment, a signal inverter is inserted in a set of connecting lines including a connecting line connecting the non-inverted port to the non-inverted terminal and a connecting line connecting the inverted port to the inverted terminal. In this embodiment, the signal inverter includes two signal transformers, and each signal transformer is inserted in one of the two connecting lines. Both signal transformers are enabled when the signal inverter is enabled and both signal transformers are disabled when the signal inverter is disabled. Each signal transformer is configured such that signals travelling through the disabled signal transformer in either direction pass through the signal transformer unaltered, and that signals travelling through the enabled signal transformer in either direction are inverted on their way through the signal transformer such that each non-inverted signal travelling through the signal transformer is transformed into the corresponding inverted signal and vice versa.

In an embodiment of the first embodiment, the output of the detector is connected to an enabling port of the signal inverter.

In another embodiment of the first embodiment, the module is configured to perform a startup routine, wherein the detector determines the connecting mode whilst the signal inverter is disabled, and to subsequently operate in one of two predefined operation modes selected based on the detected connecting mode; the operation modes including: a first operation mode selected when the connecting mode detected during the startup routine is the first connection mode, wherein the signal inverter is disabled; and a second operation mode selected when the connecting mode detected during the startup routine is the second connecting mode, wherein the signal inverter is enabled.

In another embodiment, the module comprises an integrated circuit, the integrated circuit including: the transceiver and the detector; or the integrated circuit including: the transceiver, the detector and a signal inverter; wherein the signal inverter is inserted in a set of connecting lines including a connecting line connecting the non-inverted port to the non-inverted terminal and a connecting line connecting the inverted port to the inverted terminal, and is configured such that signals travelling along the connecting lines through the signal inverter in either direction of communication whilst the signal inverter is disabled pass through the signal inverter unaltered, and that signals travelling along the connecting lines through the signal inverter in either direction of communication whilst the signal inverter is enabled are each inverted by the signal inverter.

In another embodiment, the transceiver is an RS-485 transceiver and/or a transceiver given by or including a universal asynchronous receiver/transmitter (UART).

The present disclosure further includes a field device comprising the disclosed module, the field device comprising: a device component either given by a sensor, a measurement probe, a measurement transducer or another type of measurement device, measuring at least one variable, or given by a valve, a pump, a stepper motor or another type of actuator, and a device electronic connected to the device component; wherein the module is connected to the device electronic.

In an embodiment of the field device, the processor of the module is included in the device electronic, is connected to the device electronic or is a component shared by the module and the device electronic.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
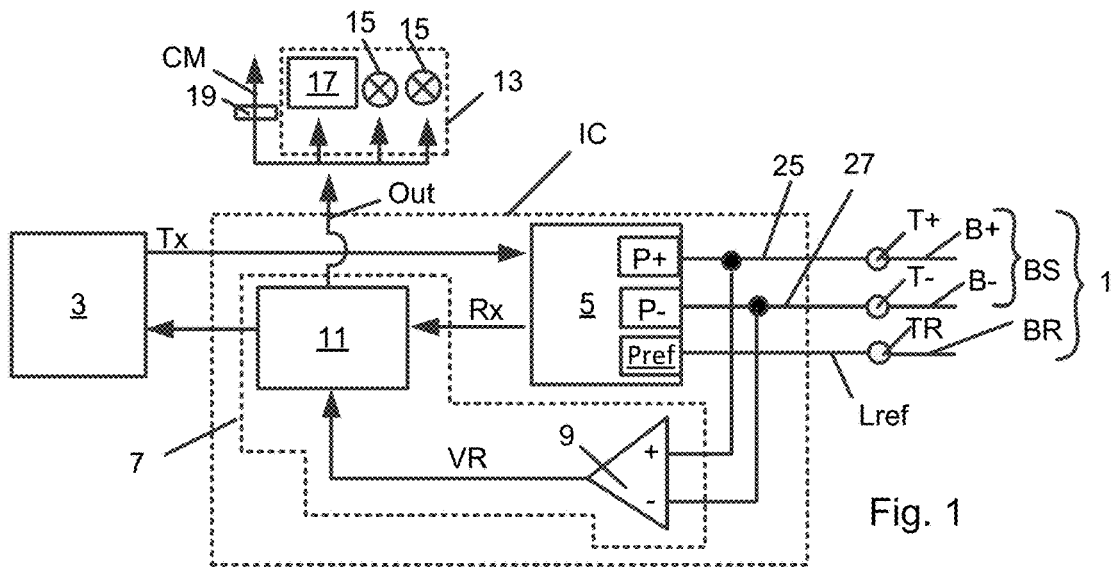
FIG. 1 shows a module for asynchronous differential serial communication.
Figure 2:
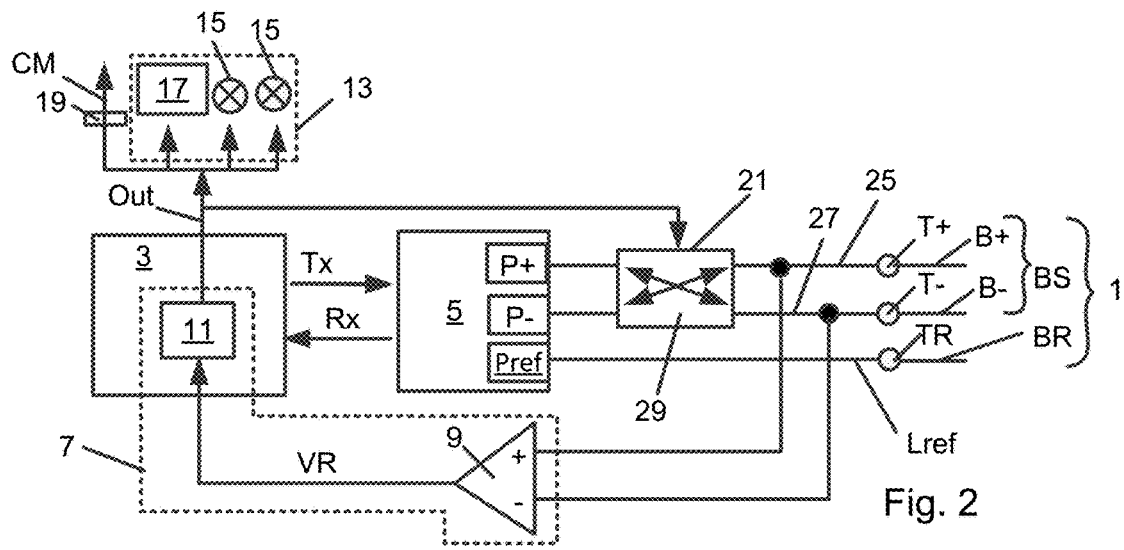
FIG. 2 shows a module including a signal inverter including a switch system.
Figure 3:
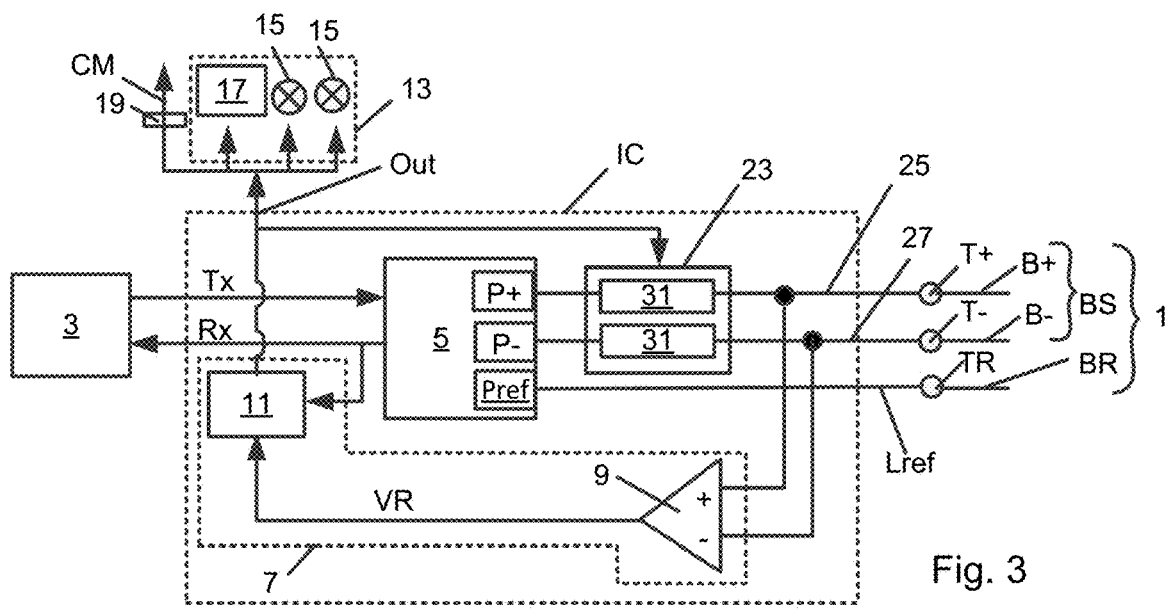
FIG. 3 shows a module including a signal inverter including signal transformers.

The present disclosure includes a module for asynchronous differential serial communication on a bus 1 and a field device including this module. Examples of the module and the bus 1 connected to each of them are shown in FIGS. 1, 2, and 3.

As shown, the bus 1 includes two signal lines BS. One of the two signal lines BS is a non-inverted bus signal line $B^+$ for transmitting non-inverted signals S+. The other one is an inverted bus signal line $B^-$ for transmitting inverted signals S−. As an option, the bus 1 may additionally include a reference line BR, also known as signal common line, providing a reference potential, common to all devices connected to the same bus 1.

The modules disclosed each include a processor 3, a transceiver 5 connected to the processor 3 and a set of terminals for connecting the module to the bus 1.

The set of terminals includes a reference terminal TR connected to or connectable to a reference potential and two signal terminals including a non-inverted terminal T+ and an inverted terminal T−. As an option, especially advantageous when communication signals are transmitted over long distances, the reference terminal TR is e.g. connected to or connectable to the reference line BR of the bus 1 providing the reference potential. This option provides better communication stability and reduces the susceptibility to electromagnetic interference.

Both signal terminals are each connectable to either one of the two signal lines BS of the bus 1. In consequence, two different connecting modes of connecting the module to the bus 1 are available. In a first connecting mode, the non-inverted terminal T+ of the module is connected to the non-inverted bus signal line B+ and the inverted terminal T− is connected to the inverted bus signal line B−. In the second connecting mode, the non-inverted terminal T+ is connected to the inverted bus signal line B− and the inverted terminal T− is connected to the non-inverted bus signal line B+.

The processor 3 is configured to provide transmit signals Tx to be transmitted onto the bus 1 by the transceiver 5 and to receive reception signals Rx determined by the transceiver 5 based on communication signals received by the module from the bus 1.

The transceiver 5 is embodied to transmit communication signals corresponding to the transmit signals Tx provided by the processor 3 onto the bus 1. Because asynchronous communication is applied, each transmit signal Tx includes a start bit having a predefined binary state specified for the communication on the bus 1. The corresponding communication signals provided by the transceiver 5 each include two complementary signals S. One of the complementary signals is a non-inverted signal S+ corresponding to the transmit signal Tx. The other one is an inverted signal S− corresponding to an inverse of the transmit signal Tx.

The transceiver 5 is embodied to receive communication signals from the bus 1, to determine corresponding reception signals Rx based on a voltage difference ΔV of the voltages V(S+), V(S−) of the two received complementary signals S and to provide the thus determined reception signals Rx to the processor 3. The transceiver 5 is further configured to determine and provide each reception signal Rx such, that it includes a start bit having the predefined binary state specified for the communication on the bus 1.

As an option the transmit signals Tx and the reception signals Rx may additionally include at least one stop bit following the data frame.

As an example, the transceiver 5 is e.g. a transceiver including a driver D driving the voltages on the bus signal lines BS connected to the transceiver 5 during transmission and a separate receiver R reading the voltages on the bus signal lines BS connected to the transceiver 5 during reception. As an alternative, the transceiver 5 is e.g. embodied in form of a single component, like e.g. a modem, performing the function of both the driver D and the receiver R.

As an option, the transceiver 5 is e.g. a RS-485 transceiver. RS-485 transceivers are designed according to the standard RS-485, also known as TIA-485(-A) or EIA-485 jointly published by the Telecommunications Industry Association and Electronic Industries Alliance (TIA/EIA). This standard is well established in industry and corresponding transceivers are available on the marked. As an additional or alternative option the transceiver is e.g. a transceiver given by or including a universal asynchronous receiver/transmitter (UART).

The transceiver 5 includes a non-inverted port P+ and an inverted port P−, each connected to one of the two signal terminals of the module. Further, a reference port Pref of the transceiver 5 is e.g. connected to the reference terminal TR via a reference line Lref.

Transmission of each communication signal is performed by the transceiver 5 providing the non-inverted signal S+ corresponding to the transmit signal Tx to be transmitted via its non-inverted port P+ and by the transceiver 5 providing the inverted signal S− corresponding to the inverse of the transmit signal Tx via its inverted port P−. When the module is connected to the bus 1, transmission of the communication signals is performed by the driver D of the transceiver 5 providing the non-inverted signal S+ and the inverted signal S− to the signal terminals connected to the transceiver 5 and thereby driving the voltages on the signal lines BS of the bus 1 connected to signal terminals accordingly.

Figure 4:
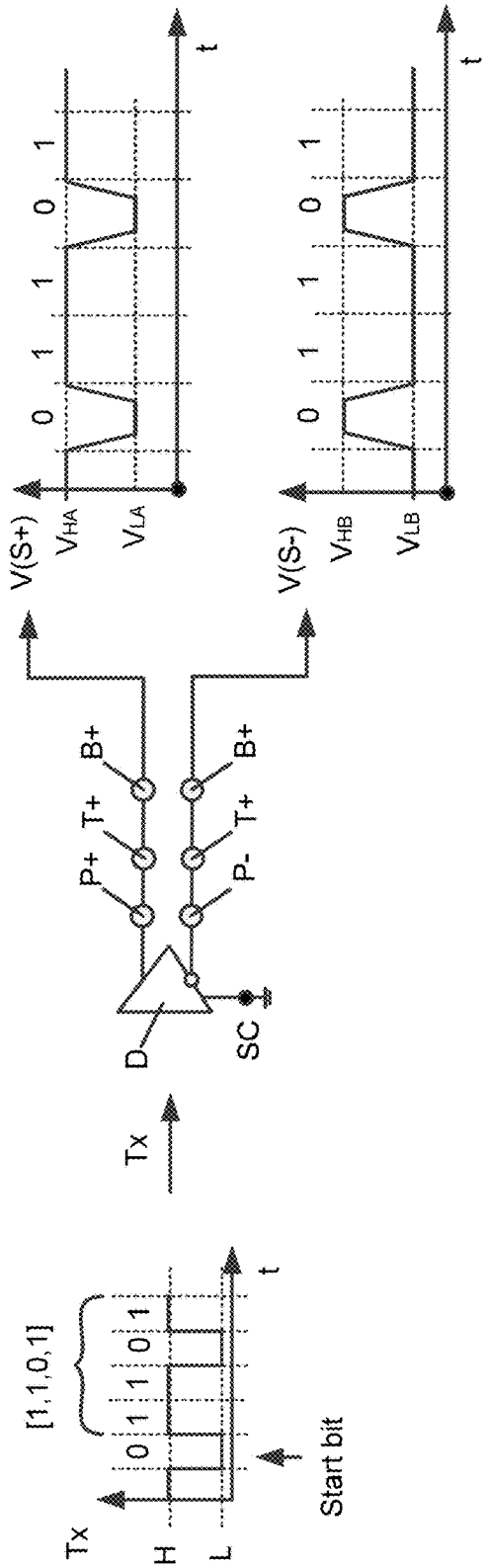
FIG. 4 shows steps of transmitting a communication signal.

In the example shown in FIG. 1, the module is connected to the bus 1 in the first connecting mode. In addition, the non-inverted port P+ of the transceiver 5 is connected to the non-inverted terminal T+ and the inverted port P− is connected to the inverted terminal T−. Thus, in this example, transmission is performed by the driver D driving the voltage on the non-inverted bus signal line B+ connected to the non-inverted terminal T+ according to the non-inverted signal S+ and by driving the voltage on the inverted bus signal line B− connected to the inverted terminal T− according to the inverted signal S−. This is illustrated in FIG. 4 based on an example of a transmit signal Tx shown on the left hand side. The transmit signal Tx is illustrated in form of a sequence of logic levels representing the digital data to be transmitted. In the example shown a positive logic is applied. Thus, a binary 1 is represented by a high logic level H and a binary 0 is represented by a low logic level L. The transmit signal Tx begins with the start bit having the predefined binary state, like e.g. the binary 0 shown in FIG. 4, followed by a data frame consisting of at least on bit or a sequence of data bits. In the example shown, the data frame includes the data bit sequence [1, 1, 0, 1] shown in FIG. 4.

As indicated in FIG. 4, the driver D provides the non-inverted signal S+ to the bus 1 via the non-inverted port P+ of the transceiver 5 connected to the non-inverted bus line B+ and the driver D provides the inverted signal S− to the bus 1 via the inverted port P− of the transceiver 5 connected to the inverted bus line B−.

A voltage V(S+) of the non-inverted signal S+ and a voltage V(S−) of the inverted signal S− provided by the driver D are shown on the right hand side in FIG. 4. In this example, the transceiver 5 is embodied such, that during transmission of a low logic level L, the voltage V(S+) of the non-inverted signal S+ is at a low voltage level VLA and the voltage V(S−) of the inverted signal S− is at a high voltage level VHB. During transmission of a high logic level H, the voltage V(S+) of the non-inverted signal S+ is at a high voltage level VHA and the voltage V(S−) of the inverted signal S− is at a low voltage level VLB. In this case, the voltage V(S+) of the non-inverted signal S+ corresponds to the logic levels of the transmit signal Tx.

The invention disclosed is not limited to this type of transceiver 5. As an alternative option, an inverting transceiver embodied such that during transmission of a low logic level L, the voltage of the non-inverted signal is at a high voltage level and the voltage of the inverted signal is at a low voltage level, and embodied such that during transmission of a high logic level H, the voltage of the non-inverted signal is at a low voltage level and the voltage of the inverted signal is at a high voltage level can be used instead of the transceiver 5. In this case, the voltage of the non-inverted signal corresponds to the inverse of the logic levels of the transmit signal Tx.

In the opposite direction of communication, the transceiver 5 is e.g. configured to start each reception of a communication signal from the bus 1 at a starting time to determined by the transceiver 5. As an example, the starting time to e.g. corresponds to the time at which an absolute value of a voltage difference ΔV between the voltage of a signal received via the non-inverted port P+ and a voltage of signal received via inverted port P− exceeds a predetermined threshold.

Figure 5:
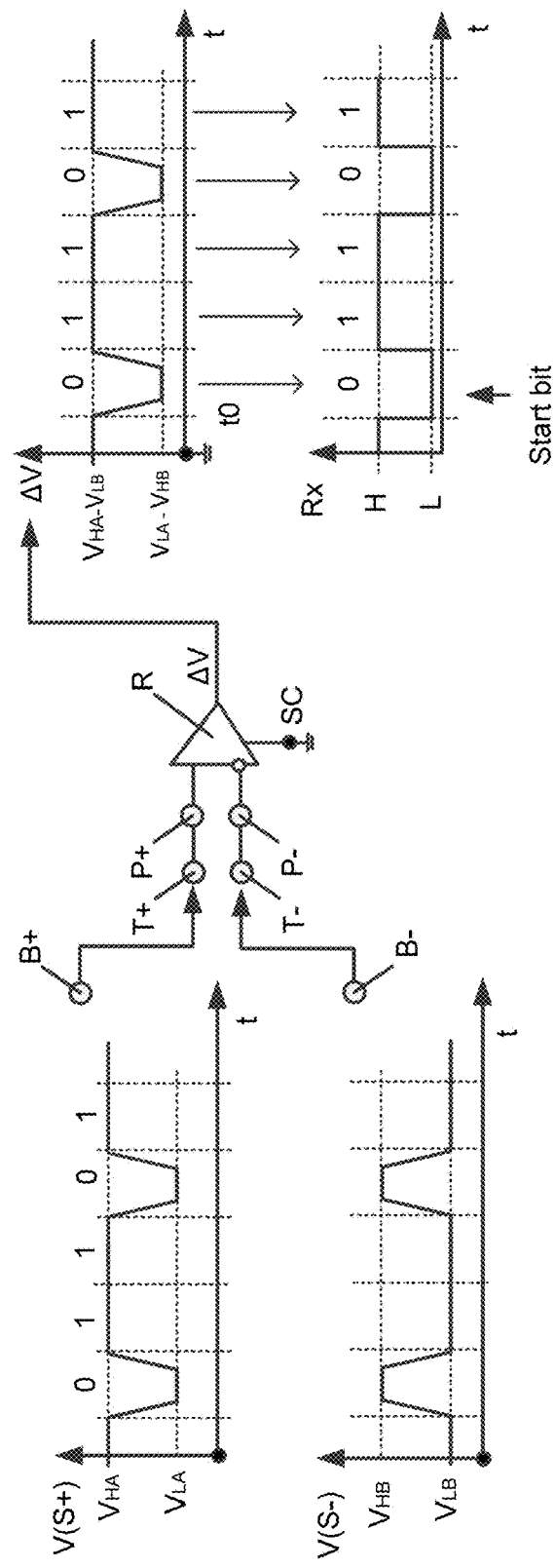
FIG. 5 shows steps of receiving a communication signal.

Following the starting time to the transceiver 5 determines the reception signal Rx based on the voltage difference ΔV between the voltage of the signal received via its non-inverted port P+ and the voltage of the signal received via its inverted port P−. As mentioned above, the transceiver 5 is configured to determine and provide each reception signal Rx such, that it starts with the start bit having the predefined binary state specified for the communication on the bus 1. Reception of a communication signal is illustrated in FIG. 5, based on the example shown in FIG. 1, wherein the module is connected to the bus 1 in the first connecting mode, and wherein the non-inverted port P+ of the transceiver 5 is connected to the non-inverted terminal T+ and the inverted port P− is connected to the inverted terminal T−. Correspondingly during reception of the communication signal shown on the left hand side in FIG. 5, the transceiver 5 receives the non-inverted signal S+ via its non-inverted port P+ and the inverted signal S− is received via the inverted port P− of the transceiver 5.

The voltage difference ΔV obtained by subtracting the voltage V(S−) of the inverted signal S− received via the inverted port P− from the voltage V(S+) of the non-inverted signal S+ received via the non-inverted port P+ is shown in FIG. 5 on the right hand side of the receiver R. This voltage difference ΔV increases at the same points in time as the voltage V(S+) of the received non-inverted signal S+ and it decreases at the same points in time as the voltage V(S+) of the received non-inverted signal S+. In consequence, in the first connecting mode, the binary state of the first received bit determined based on the voltage difference ΔV is equal to the binary state predetermined for start bit. Thus, it is recognized as a valid bit by the transceiver 5 and the reception signal Rx provided by the transceiver 5 starts with this valid start bit.

In FIG. 5, the complementary signals received from the bus 1 are identical to the non-inverted signal S+ and the inverted signal S− shown on the right hand side in FIG. 4. In consequence, the reception signal Rx determined by the transceiver 5 based on the voltage difference ΔV is identical to the transmit signal Tx shown on the left hand side of FIG. 4.

Figure 6:
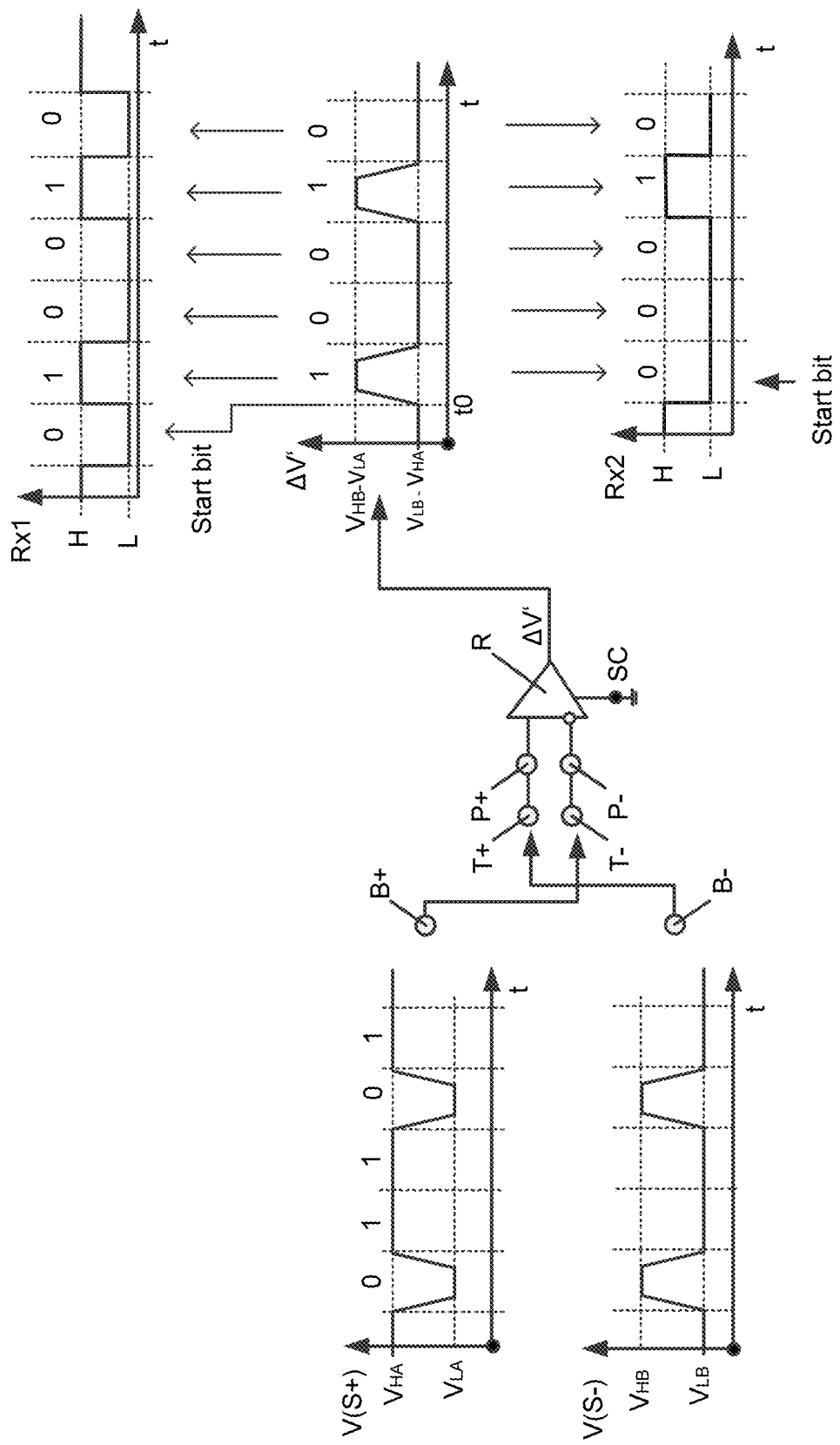
FIG. 6 shows steps of receiving a communication signal with the module of FIG. 1 connected in a second connecting mode.

FIG. 6 shows another example of the module shown in FIG. 1 receiving the communication signal shown in FIG. 5 from the bus 1. This example differs from the example shown in FIG. 5 only in that the module shown in FIG. 1 is connected to the bus 1 in the second connecting mode. Thus, in FIG. 6, the non-inverted terminal T+ of the module is connected to the inverted bus signal line B− and the inverted terminal T− is connected to the non-inverted bus signal line B−. As a result, the transceiver 5 receives the non-inverted signal S+ via its inverted port P-connected to the inverted terminal T- and the transceiver 5 receives the inverted signal S− via its non-inverted port P+ connected to the non-inverted terminal T+.

In consequence, the voltage difference ΔV' shown in FIG. 6 on the right hand side of the receiver R is determined by subtracting the voltage V(S+) of the non-inverted signal S+ received via the inverted port P− from the voltage V(S−) of the inverted signal S− received via non-inverted port P+. Thus, the voltage difference ΔV' obtained in the second connecting mode corresponds to the inverse of the voltage difference ΔV obtained in the first connecting mode. In consequence, during reception of the same communication signal from the bus 1, each bit determinable based on the voltage difference ΔV' determined in the second connecting mode has a binary state equal to the inverse of the binary state of the corresponding bit determinable based on the voltage difference ΔV determined in the first connecting mode.

Like in the previous example, reception of the communication signal is again started at the starting time to corresponding to the time at which the absolute value of the voltage difference ΔV' exceeds the threshold. Thus, the same starting time to is determined regardless of whether the module is connected in the first connecting mode shown in FIG. 5 or in the second connecting mode shown in FIG. 6.

When the module is connected in the second connecting mode as shown in FIG. 6, the first received bit determinable based on the voltage difference ΔV' in a first time interval starting at the starting time to has a binary state that is the inverse of the predefined binary state specified for the communication on the bus 1. Thus, the first received bit is not recognized as a valid start bit by the transceiver 5. Nonetheless, the transceiver 5 is configured to provide the reception signal Rx such, that it begins with a start bit having the predefined binary state.

Two examples of how the reception signal Rx can be determined by the transceiver 5 such, that it begins with a start bit having the predefined binary state are shown in FIG. 6. In the first example the transceiver 5 adds a start bit having the predetermined binary state, which is then followed by the sequence of bits determined based on the voltage difference ΔV'. The resulting reception signal Rx1 is shown in FIG. 6 above the voltage difference ΔV'. In this case, the reception signal Rx1 begins with the added start bit followed by the first received bit. In the second example, the transceiver 5 is configured to interpret the first received bit as start bit regardless of its binary state. The resulting reception signal Rx2 is shown in FIG. 6 below the voltage difference ΔV'. In this case, the reception signal Rx2 begins with a start bit having the predefined binary state, followed by the second received bit. In this reception signal Rx2, the binary state of the start bit is the inverse of the binary state of the first received bit. Neither of the two reception signals Rx1, Rx2 shown in FIG. 6 corresponds to the reception signal Rx, the transceiver 5 would have provided if the module had been connected in the first connecting mode.

The explanations regarding the determination of the reception signals Rx apply in the same way, when an inverting transducer is applied instead of the transducer 5. The only difference is, that the translation of the voltage difference ΔV, ΔV' into the logic levels will be inverse. Whereas the transducer 5 will interpret a high voltage difference ΔV, ΔV' as a binary 1 and a low voltage difference ΔV, ΔV' as a binary 0, the inverting transducer will interpret a high voltage difference ΔV, ΔV' as a binary 0 and a low voltage difference ΔV, ΔV' as a binary 1.

The module further includes a detector 7 embodied to determine, whilst the module is connected to the bus 1 during reception of a communication signal, the connecting mode and to provide an output Out indicating the detected connecting mode. To this extent, the detector 7 is configured to the determine the connecting mode based one the binary state of the start bit of the reception signal Rx provided by the transceiver 5 based on a received communication signal and a binary state of a first bit A of a reference signal Sref. The reference signal Sref is a signal corresponding to a voltage difference VR between the voltage of the signal received via the non-inverted terminal T+ of the module and the voltage of the signal received via the inverted terminal T− of the module during reception of the same communication signal.

Figure 7:
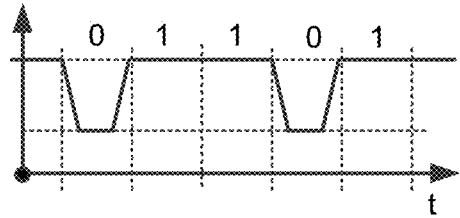
FIG. 7 shows steps of detecting a first connecting mode.
Figure 7:
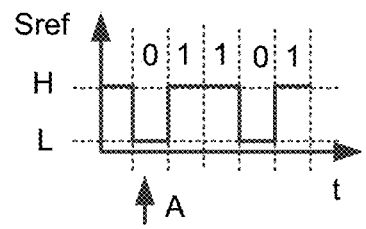

When the module is connected in the first connecting mode, the signal received via the non-inverted terminal T+ is the non-inverted signal S+ received from the non-inverted bus line B+ and the signal received via the inverted terminal T− is the inverted signal S− received from the inverted bus line B−. In this case, the voltage difference VR between the voltage of the signal received via the non-inverted terminal T+ and the voltage of the signal received via the inverted terminal T− is given by: VR:=V(S+)−V(S−) and thus corresponds to the non-inverted signal S+. As a result, the binary state of the first bit A of the reference signal Sref corresponding to the voltage difference VR is equal to the predefined binary state of the start bit of the transmit signal that was transmitted onto the bus 1 in form of the communication signal received during the detection. In consequence, the binary state of the first bit A is equal to the binary state of the start bit of the corresponding reception signal Rx. This case is illustrated in FIG. 7 showing the voltage difference VR obtained in the first connecting mode during reception of the communication signal as shown in FIG. 5 and the corresponding reference signal Sref starting with the first bit A.

Figure 8:
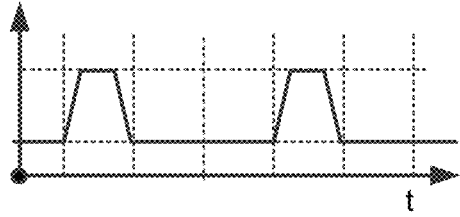
FIG. 8 show steps of detecting the second connecting mode.
Figure 8:
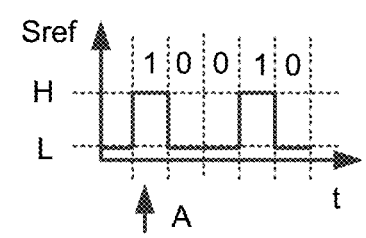

When the module is connected in the second connecting mode, the signal received via the non-inverted terminal T+ is the inverted signal S− received from the inverted bus signal line B−. In this case, the voltage difference VR between the voltage of the signal received via the non-inverted terminal T+ and the voltage of the signal received via inverted terminal T− is given by: VR:=V(S−)−V(S+) and thus corresponds to the inverted signal S−. As a result, the binary state of the first bit A of the reference signal Sref corresponding to the voltage difference VR is equal to the inverse of the predefined binary state of the start bit of the transmit signal that was transmitted onto the bus 1 in form of the communication signal received during the detection. In consequence, the binary state of the first bit A and the binary state of the start bit of the corresponding reception signal Rx are different. This is illustrated in FIG. 8 showing the voltage difference VR obtained in the second connecting mode during reception of the communication signal as shown in FIG. 6 and the corresponding reference signal Sref starting with the first bit A.

As an option, the detector 7 is e.g. configured to provide an output Out indicating the first connecting mode, when the two binary states are identical and/or to provide an output Out indicating the second connecting mode, when the two binary states are different.

Various ways of implementing the detector 7 such that it determines the connecting mode based on the binary state of the first bit of the reference signal Sref and the binary state of the start bit of the corresponding reception signal Rx both determined during reception of the same communication signal from the bus 1 can be applied.

FIGS. 1, 2, and 3 each show an example wherein the detector 7 includes a signal generator 9 having a first input connected the non-inverted terminal T+, a second input connected to the inverted terminal T- and an output providing the voltage difference VR between the voltage of the signal received via the non-inverted terminal T+ and the voltage of the signal received via the inverted terminal T−. As an example, the signal generator 9 is e.g. given by or includes a differential amplifier illustrated by the triangle shown in FIGS. 1, 2 and 3. In this case, the first input of the signal generator 9 is given by the non-inverting input of the differential amplifier, the second input of the signal generator 9 is given by the inverting input of the differential amplifier, and a voltage corresponding to the voltage difference VR is provided by the output of the differential amplifier.

The detectors 7 shown in FIGS. 1, 2 and 3 further include a signal processor 11 connected to the output of signal generator 9 and connected to an output of the transceiver 5 providing the reception signals Rx determined by the transceiver 5. This signal processor 11 is configured to determine the binary state of the first bit A of the reference signal Sref based on the voltage difference VR provided by the signal generator 9, to compare the binary state of the first bit A to the binary state of the start bit of the corresponding reception signal Rx, and to provide the output Out indicating the connecting mode determined based on the two binary states.

As an option, shown in FIGS. 1 and 3, the signal processor 11 is e.g. embodied as an individual component, like e.g. a microprocessor, connected to the signal generator 9 and to the transceiver 5. As an alternative option, shown in FIG. 2, the signal processor 11 is included or embedded in the processor 3.

The invention provides the advantages mentioned above. Individual parts of the module can be implemented in different ways without deviating from the scope of the invention.

As an example, the output Out of the detector 7 indicating whether the module is connected to the bus in the first connecting mode or in the second connecting mode can be applied in one or several different ways.

In the example shown in FIG. 1 the output Out of the detector 7 is e.g. connected to an indicator 13 located on an outside of the module and indicating the detected connecting mode determined by the detector 7. As an example the indicator 13 e.g. includes a single LED 15, like e.g. a red LED, that lights up when the second connecting mode is detected. As another example the indicator 13 e.g. includes two LEDs 15, like e.g. a first LED, like e.g. a green LED, that lights up when the first connecting mode is detected and a second LED, like e.g. a red LED, that lights up—when the second connecting mode is detected. As an additional or alternative option the indicator 13 e.g. includes a display 17, displaying the connecting mode detected by the detector 7.

The indicator 13 provides the advantage that upon receipt of a communication signal it immediately notifies the technician connecting the module to the bus 1 about the connecting mode. This provides the advantages, that an undesired connecting mode does not remain unnoticed, and that suitable remedies can be applied whilst the technician is still on site and available to perform them.

As an additional or alternative option also shown in FIG. 1, the output Out of the detector 7 indicating the detected connecting mode is e.g. provided in form of a connecting mode signal CM provided via a signal output 19 connected to the output Out of the detector 7. This provides the advantage, that information about the connecting mode can be easily provided to devices, like e.g. a service tool used by the technician, and/or a device located at a remote location. In this case the connecting mode signal CM is e.g. transmitted to the respective device via a wireless or hard wired connection, connecting the respective device to the signal output 19.

As an option, the indicator 13 and/or the signal output 19 described in context with FIG. 1 are e.g. also be foreseen on the modules shown in FIGS. 2 and 3.

Regardless of whether the module includes the indicator 13 and/or the signal output 19 or not, the functionality of the module can be further improved by additionally including a signal inverter 21, 23 inserted in a set of connecting lines including a connecting lines 25 connecting the non-inverted port P+ to the non-inverted terminal T+ and a connecting line 27 connecting the inverted port P− to the non-inverted terminal T−. Examples are shown in FIGS. 2 and 3.

These signal inverters 21, 23 are each configured such that signals travelling along the connecting lines 25, 27 through the signal inverters 21, 23 in either direction of communication whilst the signal inverters 21, 23 are disabled pass through the signal inverter 21, 23 unaltered.

Further, the signal inverters 21, 23 are each configured such that signals travelling along the connecting lines 25, 27 through the signal inverter 21, 23 in either direction of communication whilst the signal inverter 21, 23 is enabled are each inverted by the signal inverter 21, 23.

The signal inversion is e.g. performed such, that during transmission of each communication signal transmitted whilst the signal inverter 21, 23 is enabled, the enabled signal inverter 21, 23 provides a signal corresponding to the inverse of the signal received from the non-inverted port P+ of the transceiver 5 to the non-inverted terminal T+ and provides a signal corresponding to the inverse of the signal received from the inverted port P− of the transceiver 5 to the inverted terminal T− of the module. During reception of each communication signal received whilst the signal inverter 21, 23 is enabled, the enabled signal inverter 21, 23 provides a signal corresponding to the inverse of the signal received from the non-inverted terminal T+ to the non-inverted port P+ of the transceiver 5 and provides a signal corresponding to the inverse of the signal received from the inverted terminal T- to the inverted port P− of the transceiver 5.

Regarding the signal invertor 21, 23, any type of invertor suitable to perform the required inversions in both directions of communication can be applied.

FIG. 2 shows an example, wherein the signal inverter 21 is or includes a switch system 29 inserted in the connecting lines 25, 27 connecting the transceiver 5 to the signal terminals. This switch system 29 is configured to be operating in a first switch setting whilst the signal converter 21 is disabled. In the first switch setting, the switch system 29 connects the non-inverted terminal T+ to the non-inverted port P+ of the transceiver 5 and the inverted terminal T- to the inverted port P− of the transceiver 5. Further, the switch system 29 is configured to be operating in a second switch setting whilst the signal inverter 21 is enabled. In the second switch setting, the switch system 29 connects the non-inverted terminal T+ of the module to the inverted port P− of the transceiver 5 and the inverted terminal T− of the module to the non-inverted port P+ of the transceiver 5.

FIG. 3 shows an alternative embodiment, wherein the signal inverter 23 includes two signal transformers 31. Each signal transformer 31 is inserted in one of the two connecting lines 25, 27. Both signal transformers 31 are enabled when the signal inverter 23 is enabled and disabled when the signal inverter 23 is disabled. In addition each signal transformer 31 is configured such that signals travelling through the respective signal transformer 31 in either direction pass through the signal transformer 31 unaltered when the signal transformer 31 is disabled. Further, each signal transformer 31 is configured such that signals travelling through the respective signal transformer 31 in either direction are inverted on their way through the respective signal transformer 31 such that each non-inverted signal S+ travelling through the signal transformer 31 is transformed into the corresponding inverted signal S− and vice versa.

As an option available for modules including the signal inverter 21, 23, the module is e.g. configured to perform a startup routine, wherein the detector 7 determines the connecting mode whilst the signal inverter 21, 23 is disabled, and configured to subsequently operate in one of two predefined operation modes selected based on the detected connecting mode. The two operation modes include a first operation mode, selected when the connecting mode detected during the startup routine is the first connection mode and a second operation mode, selected when the connecting mode detected during the startup routine is the second connecting mode. In the first operation mode the signal inverter 21, 23 remains disabled. In the second operation mode the signal inverter 21, 23 is enabled.

In the first operation mode, the disabled signal inverter 21, 23 has no effect on the bidirectional communication performed by the module. In consequence, during operation of the module in the first operation mode whilst the module is connected in the first connecting mode, bidirectional communication is performed by the modules shown in FIGS. 2 and 3 in the same way as described above in context with FIGS. 4 and 5 for the module shown in FIG. 1.

In the second operation mode, the signal inverter 21, 23 is enabled. Due to the signal inversion performed by the enabled signal inverter 21, 23, the signals received by the transceiver 5 via the non-inverted port P+ and via the inverted port P− whilst the module is connected in the second connecting mode and the signal inverter 21, 23 is enabled are each identical to the signals the transceiver 5 would have received via the respective port if the module had been connected in the first connecting mode and the signal inverter 21, 23 had been disabled. In the opposite direction of communication, during transmission of a communication signal, the signals provided to the non-inverted terminal T+ and to the inverted terminal T− whilst the module is connected in the second connecting mode and the signal inverter 21, 23 is enabled, are each identical to the signals that would have been provided to the respective signal terminal if the module had been connected in the first connecting mode and the signal inverter 21, 23 had been disabled.

The module configured to automatically select the operation mode based on the connecting mode determined by the detector 7 during the startup routine, and to subsequently operate in the selected operation mode, provides the additional advantage that the module will always operate properly regardless of the whether it is connected in the first connecting mode or in the second connecting mode. This provides the advantage that it is no longer necessary to determine a specific wiring pattern required to achieve a specific connecting mode and that it is impossible to connect the module in a connecting mode that would cause faulty communication.

As an option, the output Out of the detector 7 determining the connecting mode during the startup procedure is e.g. connected to an enabling port of the signal inverter 21, 23. In this case, the signal inverter 21, 23 is configured such that is enabled by the output Out provided by the detector 7 during the startup routine when the detected connecting mode is the second connecting mode and that is remains disabled when the detected connecting mode is the first connecting mode.

As an alternative option, the output Out of the detector 7 is e.g. provided to a controller—not shown—selecting the operation mode based on the detected connecting mode and enabling or disabling the signal inverter 21, 23 accordingly.

As an additional or alternative option, the transceiver 5 and the detector 7 are e.g. each implemented as a component of a single integrated circuit IC including each of these components. When the module additionally includes the signal inverter 21, 23, the transceiver 5, the detector 7 and the signal inverter 21, 23 are e.g. each implemented as a component of a single integrated circuit IC including each of these components. Corresponding integrated circuits IC are indicated by dotted lines in FIGS. 1 and 3. Each of these integrated circuits IC provides the advantage that it reduces the manufacturing cost of the module when larger numbers of modules are produced.

Another advantage is that due to the small size of the integrated circuits IC, less space is required inside the module to accommodate the transceiver 5, the detector 7 and the optional signal inverter 21, 23. This allows for the size of the entire module to be reduced accordingly. Modules of smaller size are especially advantageous when the module is to be implemented in a field device.

Figure 9:
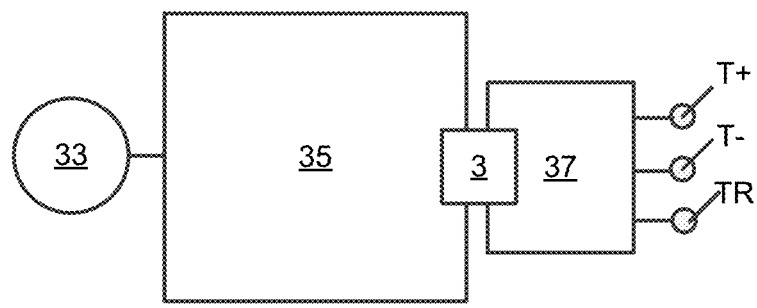
FIG. 9 shows a field device.

An example of a field device is shown in FIG. 9. The field device includes a device component 33, a device electronic 35 connected to the device component 33 and a module 37, like e.g. one of the modules shown in FIGS. 1, 2 and 3. Within the field device, the processor 3 providing the transmit signals Tx and receiving the reception signals Rx is e.g. included in the device electronic 35 or connected to the device electronic 35. FIG. 9 shows an example, wherein the processor 3 is a component shared by the module 37 and the device electronic 35.

The device component 33 may be e.g. a measurement device, like e.g. a sensor, a measurement probe, a measurement transducer or another type of measurement device, measuring at least one variable. The device component 33 may be an actuator, like e.g. a valve, a pump, a stepper motor or another type of actuator, like e.g. an actuator applied to influence operation of a site or facility and/or to influence a process performed at, on or by the site or facility.

Figure 10:
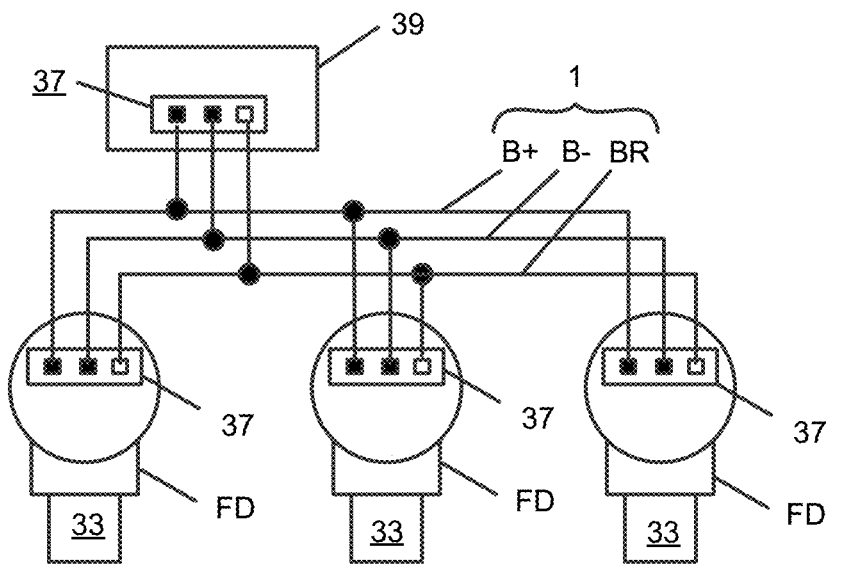
FIG. 10 shows field devices and a superordinate unit connected to a bus.

The module 37 enables the field device to communicate over the bus 1 connected to or connectable to the terminals of the module 37. FIG. 10 shows an example of an application, wherein a number of field devices FD located at decentralized locations in the field, e.g. at various different positions distributed across a site, and a superordinate unit 39, each including a module 37 for asynchronous differential serial communication are connected to the same bus 1.

In this application, the modules 37 of the field devices FD enable each field device FD to communicate with at least one other field device FD and/or the superordinate unit 39 connected to the same bus 1. As an example, the superordinate unit 39 is e.g. a control unit, an automation system or a programmable logical controller, embodied to monitor, regulate and/or to control operation of the site and/or at least one process performed at, on or by the site. As an example a valve included in one of the field devices FD may be opened or closed by the superordinate unit 39 according to a physical variable, like e.g. a pressure, a temperature or a level, measured by another one of the field devices FD based on corresponding communication signals, like e.g. measurement signals and/or control signals, transmitted over bus 1.

The invention claimed is:

1. A module for asynchronous differential serial communication on a bus, the module comprising:
 a processor, a transceiver connected to the processor, and a set of terminals connected to the transceiver; the set of terminals including a reference terminal connected to or connectable to a reference potential and further including two signal terminals including a non-inverted terminal and an inverted terminal;
 wherein the transceiver is embodied to transmit communication signals corresponding to transmit signals provided by the processor, each communication signal including a start bit having a predefined binary state specified for communication on the bus,
 wherein the transceiver includes a non-inverted port connected to one of the signal terminals providing non-inverted signals corresponding to the transmit signals and further includes an inverted port connected to the other one of the signal terminals providing inverted signals corresponding to an inverse of the transmit signals,
 wherein the transceiver is configured to receive communication signals and to determine corresponding reception signals based on a voltage difference of a voltage of a signal received via the transceiver's non-inverted port and a voltage of a signal received via the transceiver's inverted port during reception of the respective communication signal such that each reception signal includes a start bit having a predefined binary state,
 wherein the module is connectable to the bus in two different connecting modes including a first connecting mode in which the non-inverted terminal is connected to a non-inverted bus signal line of the bus and the inverted terminal is connected to an inverted bus signal line of the bus, and further including a second connecting mode in which the non-inverted terminal is connected to the inverted bus signal line and the inverted terminal is connected to the non-inverted bus signal line, and
 wherein the module further comprises a detector embodied to determine the connecting mode based on a binary state of the start bit of the reception signal provided by the transceiver based on a communication signal received whilst the module is connected to the bus and a binary state of a first bit of a reference signal corresponding to a voltage difference between a voltage of a signal received via the non-inverted terminal and a voltage of a signal received via the inverted terminal during reception of the same communication signal and to provide an output indicating the detected connecting mode.

2. The module of claim 1, wherein the detector is configured to provide an output indicating that the module is connected to the bus in the first connecting mode when the binary state of the first bit of the reference signal and the binary state of the start bit of the reception signal are identical and configured to provide an output indicating that the module is connected to the bus in the second connecting mode when the binary state of the first bit of the reference signal and the binary state of the start bit of the reception signal are different.

3. The module of claim 1, wherein the detector includes:
 a signal generator having a first input connected the non-inverted terminal, a second input connected to the inverted terminal, and an output providing the voltage difference between the voltage of the signal received via the non-inverted terminal and the voltage of the signal received via the non-inverted terminal; and
 a signal processor connected to the output of the signal generator and connected to an output of the transceiver providing the reception signal, wherein the signal processor is configured to determine the binary state of the first bit based on the voltage difference provided to the signal processor by the signal generator, to compare the binary state of the first bit to the binary state of the start bit of the corresponding reception signal, and to provide the output indicating the connecting mode determined by the signal processor based on the two binary states.

4. The module of claim 1, wherein the signal generator is or includes a differential amplifier providing a voltage corresponding to the voltage difference, the differential amplifier having a non-inverting input connect to the non-inverted terminal, an inverting input connected to the inverted terminal and an output connected to the signal processor.

5. The module of claim 1, further comprises at least one of:
an indicator connected to the output of the detector; the indicator including at least one of a single LED or a single red LED that lights up when the second connecting mode is detected, or two LEDs including a first LED or a green LED that lights up when the first connecting mode is detected and a second LED or a red LED that lights up when the second connecting mode is detected;
a display displaying the connecting mode detected by the detector; and
a signal output connected to the output of the detector and providing a connecting mode signal indicating the connecting mode detected by the detector.

6. The module of claim 1, further comprising:
a signal inverter, wherein the signal converter is:
inserted in a set of connecting lines including a connecting line connecting the non-inverted port to the non-inverted terminal and a connecting line connecting the inverted port to the inverted terminal;
configured such that signals travelling along the connecting lines through the signal inverter in either direction of communication whilst the signal inverter is disabled pass through the signal inverter unaltered; and
configured such that signals travelling along the connecting lines through the signal inverter in either direction of communication whilst the signal inverter is enabled, are each inverted by the signal inverter.

7. The module of claim 1, further comprising:
a signal inverter inserted in a connecting line connecting the non-inverted port to the non-inverted terminal and a connecting line connecting the inverted port to the inverted terminal;
wherein the signal inverter is configured such, that signals travelling along the connecting lines through the signal inverter in either direction of communication whilst the signal inverter is disabled pass through the signal inverter unaltered;
wherein the signal inverter is further configured such that during transmission of each communication signal transmitted whilst the signal inverter is enabled, the enabled signal inverter provides a signal corresponding to the inverse of the signal received from the non-inverted port of the transceiver to the non-inverted terminal and provides a signal corresponding to the inverse of the signal received from the inverted port of the transceiver to the inverted terminal; and
wherein the signal inverter is further configured such that during reception of each communication signal received whilst the signal inverter is enabled, the enabled signal inverter provides a signal corresponding to the inverse of the signal received from the non-inverted terminal to the non-inverted port of the transceiver and provides a signal corresponding to the inverse of the signal received from the inverted terminal to the inverted port.

8. The module of claim 1, further comprising:
a signal inverter inserted in a connecting line connecting the non-inverted port to the non-inverted terminal and a connecting line connecting the inverted port to the inverted terminal;
wherein the signal inverter is or includes a switch system configured to operate in a first switch setting whilst the signal inverter is disabled, wherein the switch system connects the non-inverted terminal to the non-inverted port and connects the inverted terminal to the inverted port; and operate in a second switch setting whilst the signal inverter is enabled, wherein the switch system connects the non-inverted terminal to the inverted port and connects the inverted terminal to the non-inverted port.

9. The module of claim 1, further including:
a signal inverter inserted in a connecting line connecting the non-inverted port to the non-inverted terminal and a connecting line connecting the inverted port to the inverted terminal,
wherein the signal inverter includes two signal transformers, each signal transformer is inserted in one of the two connecting lines,
wherein both signal transformers are enabled when the signal inverter is enabled and both signal transformers are disabled when the signal inverter is disabled, and
wherein each signal transformer is configured such that signals travelling through the disabled signal transformer in either direction pass through the signal transformer unaltered, and that signals travelling through the enabled signal transformer in either direction are inverted on their way through the signal transformer such that each non-inverted signal travelling through the signal transformer is transformed into the corresponding inverted signal and vice versa.

10. The module of claim 6, wherein the output of the detector is connected to an enabling port of the signal inverter.

11. The module of claim 6,
wherein the module is configured to perform a startup routine in which the detector determines the connecting mode whilst the signal inverter is disabled, and further configured to subsequently operate in one of two predefined operation modes selected based on the detected connecting mode, and
wherein the two predefined operation modes include a first operation mode selected when the connecting mode detected during the startup routine is the first connection mode, wherein the signal inverter is disabled, and a second operation mode selected when the connecting mode detected during the startup routine is the second connecting mode, wherein the signal inverter is enabled.

12. The module of claim 1, further comprising:
an integrated circuit including the transceiver and the detector, or including the transceiver, the detector, and a signal inverter;
wherein the signal inverter is inserted in a connecting line connecting the non-inverted port to the non-inverted terminal and a connecting line connecting the inverted port to the inverted terminal, and wherein the signal inverter is configured such that signals travelling along the connecting lines through the signal inverter in either direction of communication whilst the signal inverter is disabled pass through the signal inverter unaltered, and that signals travelling along the connecting lines through the signal inverter in either direction of communication whilst the signal inverter is enabled are each inverted by the signal inverter.

13. The module of claim 1, wherein the transceiver is an RS-485 transceiver and/or a transceiver given by or including a universal asynchronous receiver/transmitter (UART).

14. A field device, comprising:
a module for asynchronous differential serial communication on a bus, the module comprising:
 a processor, a transceiver connected to the processor, and a set of terminals connected to the transceiver; the set of terminals including a reference terminal connected to or connectable to a reference potential and further including two signal terminals including a non-inverted terminal and an inverted terminal;
 wherein the transceiver is embodied to transmit communication signals corresponding to transmit signals provided by the processor, each communication signal including a start bit having a predefined binary state specified for communication on the bus,
 wherein the transceiver includes a non-inverted port connected to one of the signal terminals providing non-inverted signals corresponding to the transmit signals and further includes an inverted port connected to the other one of the signal terminals providing inverted signals corresponding to an inverse of the transmit signals,
 wherein the transceiver is configured to receive communication signals and to determine corresponding reception signals based on a voltage difference of a voltage of a signal received via the transceiver's non-inverted port and a voltage of a signal received via the transceiver's inverted port during reception of the respective communication signal such that each reception signal includes a start bit having a predefined binary state,
 wherein the module is connectable to the bus in two different connecting modes including a first connecting mode in which the non-inverted terminal is connected to a non-inverted bus signal line of the bus and the inverted terminal is connected to an inverted bus signal line of the bus, and further including a second connecting mode in which the non-inverted terminal is connected to the inverted bus signal line and the inverted terminal is connected to the non-inverted bus signal line, and
 wherein the module further comprises a detector embodied to determine the connecting mode based on a binary state of the start bit of the reception signal provided by the transceiver based on a communication signal received whilst the module is connected to the bus and a binary state of a first bit of a reference signal corresponding to a voltage difference between a voltage of a signal received via the non-inverted terminal and a voltage of a signal received via the inverted terminal during reception of the same communication signal and to provide an output indicating the detected connecting mode;
a device component either given by a sensor, a measurement probe, a measurement transducer or another type of measurement device, measuring at least one variable, or given by a valve, a pump, a stepper motor or another type of actuator; and
a device electronic connected to the device component; wherein the module is connected to the device electronic.

15. The field device of claim 14, wherein the processor of the module is included in the device electronic, is connected to the device electronic, or is a component shared by the module and the device electronic.

* * * * *